(12) United States Patent
Lin et al.

(10) Patent No.: US 8,635,475 B2
(45) Date of Patent: Jan. 21, 2014

(54) APPLICATION-SPECIFIC POWER MANAGEMENT

(75) Inventors: Qingwei Lin, Beijing (CN); Fan Li, Beijing (CN); Jiang Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 258 days.

(21) Appl. No.: 12/913,381

(22) Filed: Oct. 27, 2010

(65) Prior Publication Data

US 2012/0110360 A1 May 3, 2012

(51) Int. Cl.
*G06F 1/00* (2006.01)
*G06F 1/26* (2006.01)
*G06F 1/32* (2006.01)

(52) U.S. Cl.
USPC .......................................... 713/320; 713/300

(58) Field of Classification Search
USPC ................................. 713/300, 320
See application file for complete search history.

(56) References Cited

U.S. PATENT DOCUMENTS

| | | | |
|---|---|---|---|
| 5,717,879 A | 2/1998 | Moran et al. | |
| 5,781,720 A | 7/1998 | Parker et al. | |
| 6,260,111 B1 * | 7/2001 | Craig et al. | 711/115 |
| 6,347,377 B2 * | 2/2002 | Barbee | 713/300 |
| 6,801,811 B2 | 10/2004 | Ranganathan et al. | |
| 6,885,974 B2 * | 4/2005 | Holle | 702/182 |
| 7,337,428 B2 | 2/2008 | Kipman et al. | |
| 7,380,147 B1 * | 5/2008 | Sun | 713/323 |
| 7,389,432 B2 | 6/2008 | Chandley et al. | |
| 7,743,267 B2 * | 6/2010 | Snyder et al. | 713/320 |
| 8,063,872 B2 * | 11/2011 | Forstall et al. | 345/102 |
| 2006/0005132 A1 | 1/2006 | Herdeg, III | |
| 2006/0259803 A1 * | 11/2006 | Edwards et al. | 713/320 |
| 2008/0109663 A1 * | 5/2008 | Snyder et al. | 713/300 |
| 2009/0172536 A1 | 7/2009 | Cheng et al. | |
| 2011/0252252 A1 * | 10/2011 | Ramakrishnan et al. | 713/320 |

OTHER PUBLICATIONS

"AnalogicTech Optimizes Power Management for Small Form Factor Backlit Screens", retrieved on Aug. 2, 2010 at <<http://www.eetimes.com/electronics-products/electronic-product-releases/embedded-tools/4203947/AnalogicTech-Optimizes-Power-Management-for-Small-Form-Factor-Backlit-Screens>>, EE Times Group, Advanced Analogic Technologies, Inc., Press Release, Jun. 1 2010, pp. 1-3.

Dick, et al., "Analysis of Power Dissipation in Embedded Systems Using Real-Time Operating Systems", retrieved on Aug. 2, 2010 at <<http://robertdick.org/publications/dick03may.pdf>>, IEEE Transactions on Computer-Aided Design of Integrated Circuits and Systems, vol. 22, No. 5, May 2003, pp. 615-627.

Egger, et al., "An Application-Specific and Adaptive Power Management Technique", retrieved on Aug. 2, 2010 at <<www.cs.pitt.edu/PARC/parc-6.pdf>>, Proceedings of International Workshop on Power-Aware Real-Time Computing (PARC), Pisa, Italy, Sep. 2004, pp. 1-4.

(Continued)

*Primary Examiner* — Mark Connolly
(74) *Attorney, Agent, or Firm* — Lee & Hayes, PLLC

(57) ABSTRACT

An application-specific power management technique may establish a separate power-down interval for one or more applications based on user interaction with the one or more applications. In some implementations, during use of a particular application, when a management component determines that a period of user inactivity has become greater than or equal to the particular power-down interval established for the particular application, the management component may initiate a power down of one or more components, such as a display.

20 Claims, 8 Drawing Sheets

(56) References Cited

OTHER PUBLICATIONS

Ethier, "Application-Driven Power Management", retrieved on Aug. 2, 2010 at <<http://www.sdrforum.org/pages/sdr04/4.5%20Low%20Power%20Chakrabarti/4.5-3%20Ethier.pdf>>, SDR Forum, Proceedings of Technical Conference and Product Exposition, 2004, pp. 1-5.

Phillips, et al., "Applying Models of User Activity for Dynamic Power Management in Wireless Devices", retrieved on Aug. 2, 2010 at <<http://portal.acm.org/citation.cfm?id=1409277&dl=GUIDE&coll=GUIDE&CFID=99099307&CFTOKEN=65232746>>, ACM, Proceedings of International Conference on Human-Computer Interaction with Mobile Devices and Services (MobileHCI), Amsterdam, The Netherlands, Sep. 2008, pp. 315-318.

Rajamani, et al., "Application-Aware Power Management", retrieved on Aug. 2, 2010 at <<http://ieeexplore.ieee.org/stamp/stamp.jsp?arnumber=04086132>>, IEEE Proceedings of International Symposium on Workload Characterization, San Jose, CA, Oct. 25 2006, pp. 39-48.

"Asoftech Automation v2.0.0", FileBuzz, Published Jul. 22, 2009, 2 pages, retrived on Aug. 4, 2010 at http://www.filebuzz.com/fileinfo/55705/Asoftech_Automation.html.

Automation Batch Tools 3.0.1, Top4Download.com, Published Dec. 27, 2009, 3 pages, retrieved Aug. 3, 2010 at http://www.top4download.com/automation-batch-tools/ctqxeiig.html.

"AutoMe—automate computer tasks", asoftech, published 2006, 2 pages, retrieved Aug. 4, 2010 at http://www.asoftech.com/autome/.

Bruno et al., "Mini-Me: A Min-Repro System for Database Software", IEEE Proceedings of International Conference on Data Engineering (ICDE), Long Beach, CA, Mar. 2010, pp. 1153-1156.

"EnergyKey 2.2", safe-install.com, published May 22, 2006, 6 pages, retrieved Aug. 4, 2010 at http://www.safe-install.com/programs/energykey.html.

"Gnu xnee", Sandklef GNU Labs, Jun. 26, 2008, pp. 1-2.<<retrieved on Aug. 2, 2010 at <<http://www.sandklef.com/xnee/>>.

"Hot Keyboard 2.7", Safe-install.com, published Nov. 22, 2004, 5 pages, retrieved Aug. 4, 2010 at http://www.safe-install.com/programs/hot-keyboard.html.

Manohar et al., "The Session Capture and Replay Paradigm for Asynchronous Collaboration", Proceedings of Conference on European Conference on Computer-Supported Cooperative Work (ECSCW), Stockholm, Sweden, Sep. 1995, pp. 149-164, Kluwer Academic Publishers.

"Ranorex Recorder", Nov. 18 2007, 3 pages, retrieved on Aug. 2, 2010 at <<http://www.ranorex.com/gui-testing-guide/record-user-actions-mouse-movements-keyboard-inputs.html>>.

Silverstein, "Logical Capture/Replay", STQE Magazine, Nov./Dec. 2003, pp. 36-42, retrieved on Aug. 2, 2010 at <<http://www.silvermark.com/Library/publications/articles/sqe_logical_capture_replay.pdf>>.

"Working with Automator", Apple Inc., Tiger Developer Overview Series: Mac OS X Tiger, Mar. 6 2006, 6 pages, retrieved on Aug. 2, 2010 at <<http://developer.apple.com/macosx/automator.html>>.

* cited by examiner

116 →

| APPLICATION NAME | POWER-DOWN INTERVAL (HH:MM:SS) | AUTOMATIC CONTROL | MANUAL CONTROL |
|---|---|---|---|
| APPLICATION 1 | 3:02 | ☒ | ☐ |
| APPLICATION 2 | 2:45 | ☒ | ☐ |
| APPLICATION 3 | 3:25 | ☒ | ☐ |
| APPLICATION 4 | 15:31 | ☒ | ☐ |
| APPLICATION 5 | 5:26 | ☒ | ☐ |
| APPLICATION 6 | 4:40 | ☒ | ☐ |
| APPLICATION 7 | 2:06 | ☒ | ☐ |
| APPLICATION 8<br>  TURN OFF DISPLAY<br>  TURN OFF OTHER<br>  SYSTEM STANDBY | MANUAL<br>20:00 — 412<br>1:00:00 — 414<br>2:00:00 — 416 | ☐ | ☒ |
| APPLICATION 9 | 3:44 | ☒ | ☐ |
| ⋮ | | | |
| APPLICATION N | 4:22 | ☒ | ☐ |

FIG. 4

APPLICATION-SPECIFIC POWER MANAGEMENT

BACKGROUND

Displays, such as monitors, televisions, projectors, touch screens, or other display devices, consume a large portion of the power used by a typical computing device. For example, some studies have shown that the display can account for as much as 40 percent or more of the total system power consumption, depending on the display type, size, etc. Furthermore, it is becoming more common to have multiple displays connected to a computing device, and these displays are generally becoming larger in size, both of which are factors that further increase energy consumption of computing devices. Additionally, many computing devices are not actively used during a large portion of the time that they are on, even when users are present, and many computing devices are also left running at night and on weekends when the users are not present.

A computing device may include a power management mechanism for automatically controlling power used by displays, hard disk drives, and other components of the computing device. Further, most displays include a compatible power management feature that enables a computing device to turn the display off or reduce the amount of power that the display is using. For example, the power management mechanism of a computing device may turn off the display, dim the display, or place the display in a low power state after a predetermined period of user inactivity. As a result, power consumption of displays can be automatically reduced, which can save a large amount of energy, and thereby provide substantial savings to companies that use a large number of computing devices. For instance, a display placed into a powered-down state might typically consume 1 to 3 watts of power. In contrast, an active liquid crystal display (LCD) monitor might consume 15 to 60 watts of power, while an active cathode ray tube (CRT) display or very large LCD might consume 50 to 100 or more watts of power. However, under many conventional power management systems, the power management settings are set according to a specified period of inactivity, which does not take into consideration variations in actual user activity and behavior.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for automated management of power settings for a computing device. For example, some implementations include techniques and frameworks for controlling power management based on applications that are active on the computing device. Further, some implementations may employ a learning mechanism and statistical model for determining timing for powering down components of the computing device, such as for powering down a display following a period of user inactivity.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 4 illustrates an example of application-specific power-down intervals for application-specific power management according to some implementations.

DETAILED DESCRIPTION

Application-Specific Power Management

Figure 1:
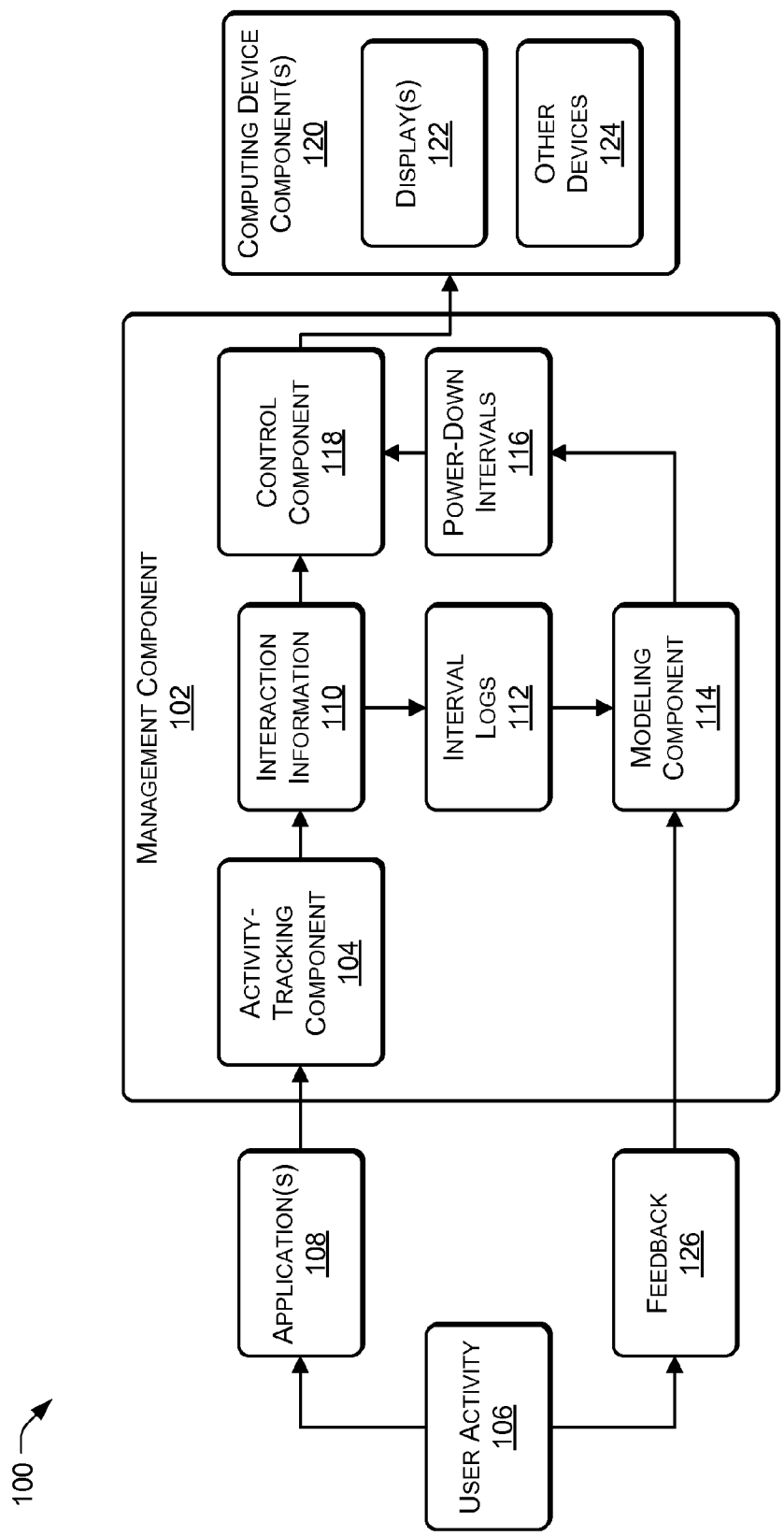
FIG. 1 is a block diagram of an example framework for application-specific power management according to some implementations.

The technologies described herein are generally directed towards a power management strategy for computing devices. Some implementations provide an application-specific power management strategy based on pattern analysis of user interaction with various applications on a computing device. For example, a particular user's activity pattern may be learned through statistical analysis of the user's interaction intervals with respect to each application. In other words, the interval or length of time of inactivity between user inputs, such as mouse movement, mouse clicks, keyboard strokes, and the like, can be tracked with respect to each application used by a user. Implementations may then automatically determine an application-specific power-down interval or time period to be used for each application based on the statistical analysis. The application-specific power-down interval for each application may be continually adjusted and optimized based on positive or negative user feedback. The techniques, frameworks and architectures disclosed herein result in power conservation and a reduction in power usage, while also taking steps to avoid overly annoying a user of a computing device.

Some implementations include learning a distribution of interaction intervals for each application used on the computing device based on logs of tracked user interactions. For example, the application-specific power management strategy may be based on a user-leaving-pattern analysis, i.e. a determination of whether the user has left or is otherwise no longer using a computing device. A statistical model may be employed to estimate proper timing with respect to each application for powering down a display or other computing device component based on an interaction interval distribution determined for the application. Thus, the timing for powering down the display or other component may vary based on which application is currently open or in use on the computing device.

Some implementations learn from the user interaction history for the various applications and also from any feedback received when the display is powered down. These implementations may then dynamically tune the power-down interval for each application based on received feedback. Since the power-down intervals can be automatically tuned and adjusted for particular applications, users will not have to manually set the power-down interval, which often involves guessing or turning off power management altogether. Further, because the power management strategy herein employs application-specific power management settings by applying different power-down intervals for different applications, the power management strategy herein can conform to the habits of individual users. Thus, the application-specific power management strategy may learn the behavior of particular users with respect to particular applications and provide suitable customized and optimized power-down settings. This strategy can save a large amount of display power, and at the same time be less annoying to the user.

Additionally, implementations herein may be software-based, so that, unlike some conventional systems, additional hardware may not be needed to detect the user presence. Further, the techniques applied herein do not necessarily adjust or modify the display color, refresh rate, brightness, or the like, to achieve power savings, so there is no detrimental effect on readability or viewability of an attached display device. In addition to powering down a display, some implementations of the power management techniques herein may be applied to other computing device components, such as for spinning down a hard disk drive, powering down a video card, hibernating the system, placing the system in a sleep or standby mode, and so forth.

Example Framework

FIG. 1 is a block diagram of an example framework 100 for application-specific power management according to some implementations. Framework 100 includes a management component 102 having an activity-tracking component 104. Activity tracking component 104 may monitor and log user activity 106 with respect to one or more applications 108. For example, according to some implementations herein, the activity-tracking component 104 may collect user interaction information 110 with respect to each of the different applications 108 for statistical learning purposes.

The activity-tracking component 104 may store the collected interaction information 110 in interval logs 112 generated for each of the applications 108. For example, a separate interval log 112 may be maintained for each application 108. The collected user interaction information 110 is stored in the interval logs 112 for analysis by a modeling component 114. For example, in some implementations, the modeling component 114 may build a suitable statistical distribution model, such as a cumulated distribution function (CDF) representation, for estimating an initial application-specific power-down interval 116 for each application 108.

The power-down intervals 116 for each application 108 may be provided to a control component 118. For example, the power-down intervals 116 may comprise a list that maps a particular power-down interval to a corresponding particular application. The control component 118 may determine, from the interaction information 110, which application 108 is currently being used, and may monitor any user activity 106 with respect to the current application 108. When control component 118 determines that there has been a period of inactivity greater than or equal to a corresponding power-down interval 116 for the currently active application 108, the control component 118 may perform an operation to initiate power conservation. For example, the control component may send a control signal to initiate powering down one or more computing device components 120, such as one or more displays 122 managed by the management component 102. Further, the power management of other devices 124 (e.g., other physical computing device components or hardware) may be controlled based on the power management of the one or more displays 122. For example, the other devices 124 may be powered down a predetermined period of time following powering down of the displays 122.

The power-down intervals 116, as initially estimated, may be applied for power conservation, such as by powering down the computing device component 120 and monitoring user feedback 126. For instance, if the display 122 is powered down while a user is looking at the display 122, the user may provide a response or feedback 126. For example, as feedback 126, the user may provide an input through an input device, such as by moving a mouse, pressing a keyboard key, or the like. The feedback may be provided within a predetermined period of time after the powering down of the computing device component 120. For example, a threshold time period, such as 10, 20, 30, 60 seconds, or the like, may be established such that if a user input is received within the specified time period, the management component determines that the user was still using the computing device and that the initiation of power conservation was premature. Thus, if the power-down interval 116 is underestimated or too short, i.e., the user is still present and using the computing device component 120 and/or application 108, the user may provide feedback 126 within the specified feedback threshold time period.

The modeling component 114 receives the feedback 126 and may adjust the power-down interval 116 for the particular application 108, such as to increase the power-down interval so that in the future a longer power-down interval 116 will be applied when the particular application 108 is being used. Alternatively, if no feedback is received, in some implementations, the modeling component 114 may apply an algorithm to shorten the power-down interval 116 for the particular application 108, so that additional power savings might be gained in the future. By continually learning from user interaction history and any feedback or response provided, implementations herein can refine and dynamically tune to an optimum power-down interval 116 for each application 108. Thus, through the dynamic tuning of the statistical model and adjustment of the power-down interval 116 for each application, the more frequently that each application 108 is used, the more accurate the power-down interval 116 for that application becomes. Consequently, implementations herein are able to automatically determine and set an appropriate optimal power-down interval 116 for each application 108. This not only results in substantial power savings, but also avoids overly annoying the user.

Additionally, rather than merely sending a signal to power-down the display 122, the control component 118 may first perform other control functions. For example, rather than immediately powering down the display 122, the display may be gradually brought to the powered-down state, such as by first changing from a full-color mode to a black-and-white mode, or by gradually dimming the display to indicate to a user that may be present that the display will soon be powered down. This gives the user an opportunity to provide feedback 126 before the display 122 is actually powered down, thereby reducing user annoyance.

Further, the other devices 124 may be powered down at some point in time after the display 122 so that the user is aware that the power down is taking place and provided an opportunity to provide feedback. For example, there may be work running in the background, so it may be undesirable to power down the other devices 124, or place the system into a sleep or standby mode at the same time that the display is powered down. Consequently, according to some implementations, powering down of display 122 may be performed, and if no feedback is received within the feedback threshold time period, then after some other predetermined time period, powering down of the other devices 124 may be initiated. For example, just certain other devices, such as the hard disk drive(s) or video card(s) may be powered down, or the entire system may be placed into sleep, standby, hibernation, or the like. Further, in some implementations, the user may individually control the power management of the other devices 124, such as for manually specifying a time period for powering down of particular other devices 124, manually specifying a time period for sleep, standby, hibernation, and the like. Thus, according to some implementations herein, the power management of the other devices 124 may be based on the application specific power management of the display(s) 122. Alternatively, however, in some implementations, the user may specify that the other devices 124 not be powered down, or that no system sleep, standby or hibernation take place.

As another alternative, the control component 118 may log the user out of a computing device prior to powering down the display or other computing device components. For example, computing devices are often set by system administrators to log off a user after a detected period of user inactivity, such as for security purposes. Thus, the techniques herein may provide an application-specific technique for determining when to log off a user. Further, the powering down of the display may be configured to take place at some point in time after the logging off is performed, or may take place contemporaneously with the logging off.

Example Process

Figure 2A:
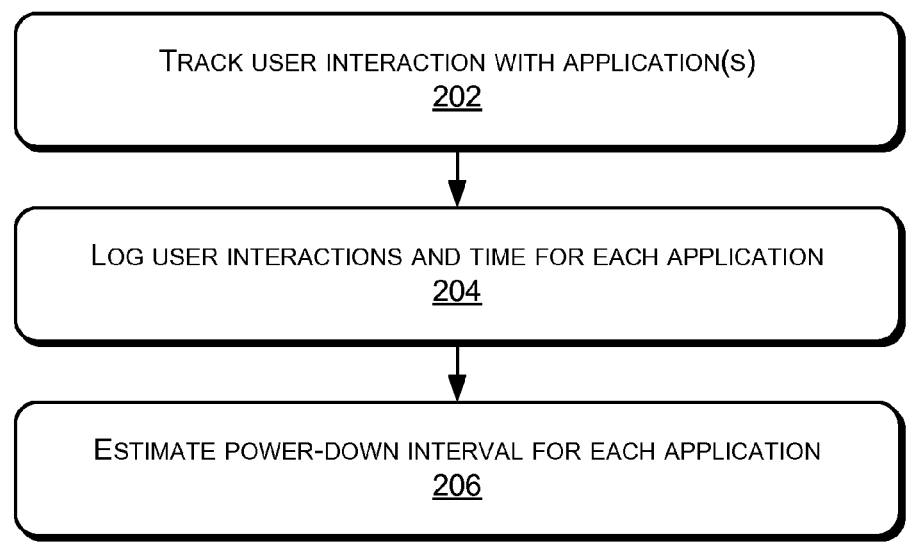
FIGS. 2A and 2B are flow diagrams of example processes for application-specific power management according to some implementations herein.
Figure 2B:
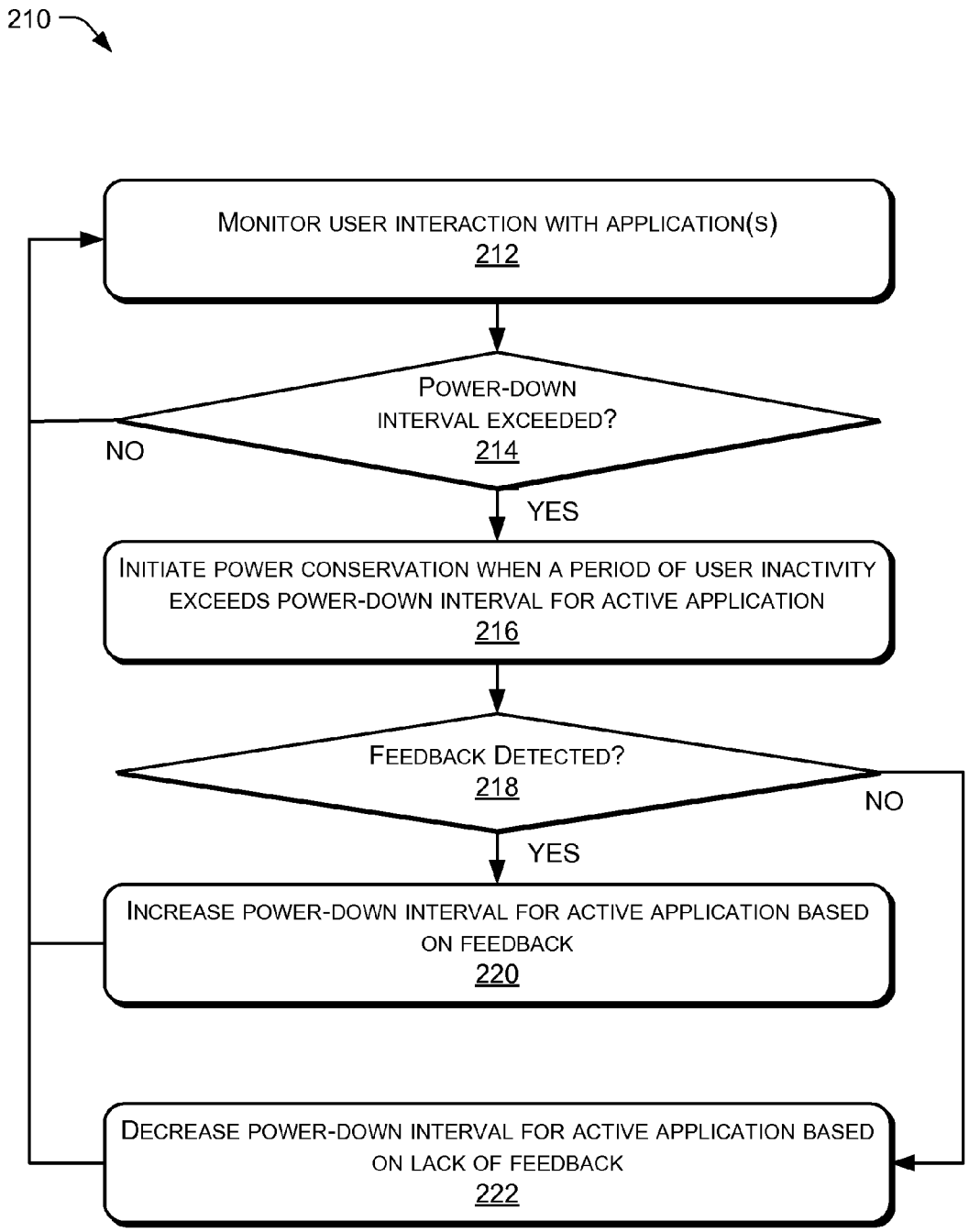

FIGS. 2A and 2B are flow diagrams of example processes 200 and 210, respectively, for application-specific power management according to some implementations herein. Process 200 of FIG. 2A illustrates an example of determining initial power-down interval for the applications. Process 210 of FIG. 2B illustrates an example of applying application-specific power-down intervals for power management.

In the flow diagrams of FIGS. 2A and 2B, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the processes 200 and 210 are described with reference to the framework 100 of FIG. 1, although other frameworks, devices, systems and environments may implement this process.

Turning to FIG. 2A, the process 200 may be executed when an application is first used, or may be executed each time an application is used for continually refining or updating a power-down interval for each application.

At block 202, user interaction with one or more applications 108 is tracked for detecting user interaction information 110. For example, activity-tracking component 104 may monitor user activity and interaction when an application is in use, and capture the user interactions, together with points in time at which the interaction occurred. The interaction information may be based on detection of mouse clicks, mouse cursor movement, keyboard strokes, or other user inputs, along with a timing associated with each input for determining an interval between each input with respect to a particular application that is in use.

At block 204, the user interaction information 110, such as detected user input activity and the corresponding points in time of the user activity, is recorded in one or more log files 112 by the activity-tracking component. For example, a separate log file may be maintained for each application 108 that is used.

At block 206, a modeling component 114 may estimate a suitable power-down interval 116 for each application 108. For example, the modeling component may parse each of the log files 112 for each application 108 to determine a statistical distribution of the interaction intervals for each application. The modeling component 114 may then model the statistical results for each application 108 and use the results to estimate a power-down interval for each application 108. Additionally, in some implementations, when a user first uses an application 108, prior to the initial estimation of a power-down interval 116, the management component 102 may use a default power-down interval previously determined for that application. For example, different applications 108 may have different default power-down intervals, such as may be specified by a provider of the management component 102 based upon information collected empirically from one or more other users. Accordingly, in some implementations, the default power-down intervals may serve as a starting point for determining an optimized power-down interval for each application for a particular user. Furthermore, the process 200 of FIG. 2A may be used for adjusting existing power-down intervals for applications. For example, over time a user's habits with respect to a particular application might change, and these changes, along with any feedback received, can be taken into consideration by modeling component 114 when determining an appropriate power-down interval.

Turning to FIG. 2B, process 210 applies the power-down intervals for the applications for performing application-specific power management during use of one or more applications.

At block 212, user interaction with one or more active applications is monitored continually. For example, the interaction information 110 collected by the activity-tracking component 104 may be monitored by the control component 118.

At block 214, the control component 118 may determine whether the power-down interval corresponding to an active application has been exceeded. When the control component detects that a period of user inactivity has exceeded the power-down interval 116 for an application 108 currently in use, the control component 118 may power-down the display. For example, the control component 118 may continually compare user interaction information 110 for a particular application 108 that is currently in use with the particular power-down interval 116 for that particular application. Additionally, when multiple applications are active contemporaneously, the longer of one or more power-down intervals may be applied.

At block 216, when a period of user inactivity exceeds the power-down interval for the active application, power conservation may be initiated. For example, the control component may send a signal to power down a display, or take other action, such as performing user log off, as described above.

At block 218, a determination is made as to whether any feedback is received in response to the power conservation. For example, if a user makes an input, such as moving a mouse, tapping a keyboard, or the like, within a predetermined period of time (the feedback threshold), then feedback 126 is considered to have been received.

At block 220, the power-down interval 116 may be increased based on user feedback 126 received in response to powering down the display. For example, the modeling component 114 may dynamically increase the power-down interval for an active application 108 in response to user feedback 126 and generate a more accurate or optimal power-down interval 116 for that application 108.

At block 222, in some implementations, if no feedback is received, the modeling component may shorten the power-down interval by a certain amount to attempt to attain additional power savings the next time the application is used. Consequently, as the user uses each application 108 more and more, the power-down intervals 116 will become more and more accurate and optimized for the particular user. Furthermore, as discussed above with respect to process 200, even without feedback 126, after the initial power-down interval 116 has been estimated, the modeling component 114 may continue to refine the power-down intervals 116 for each application 108 based upon additional user interaction information 110 collected by the activity-tracking component 104.

The above framework and process for power management may be implemented in a number of different environments and situations. Further, while several examples are described herein for explanation purposes, the disclosure is not limited to the specific examples, and can be extended to additional devices, environments, applications and settings.

Example Computing Device

Figure 3:
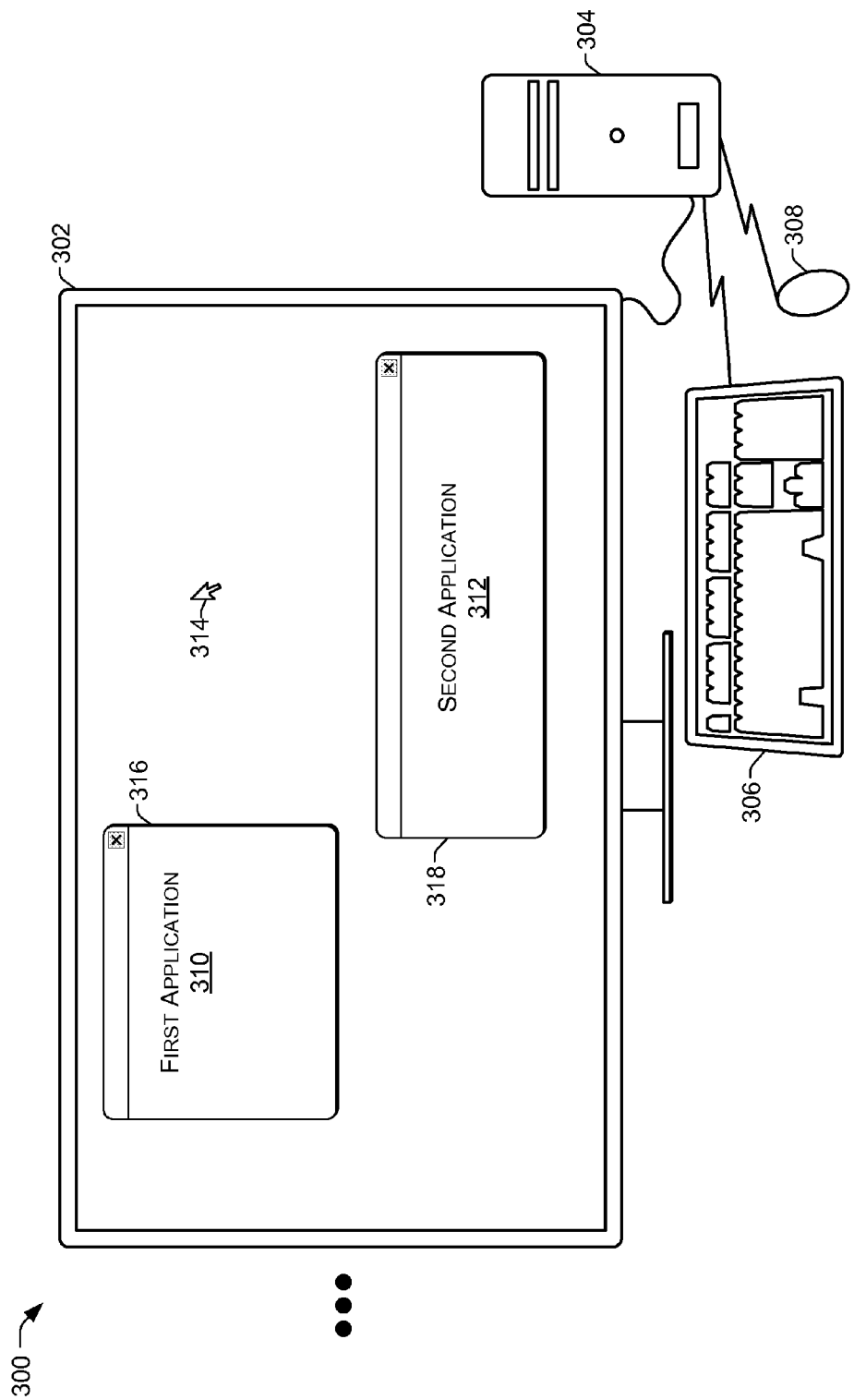
FIG. 3 illustrates an example of a computing device for incorporating power management according to some implementations.

FIG. 3 illustrates an example of a computing device 300 that may execute application-specific power management according to some implementations herein. Computing device 300 includes one or more displays 302 coupled to a computer 304. Computer 304 may also include a variety of input devices such as a keyboard 306 and a mouse 308. One or more applications may be active or in use on the computing device 300. In the illustrated example, a first application 310 and a second application 312 are active, although in other examples only a single application may be in use, while in yet other examples, a number of additional applications may be active.

Capturing User Interactions

As a user interacts with the applications 310, 312, such as with a mouse cursor 314, mouse 308 and/or keyboard 306, the interactions are tracked and logged, as described above. For example, the first application 310 may be in a first window 316 that is separate from a second window 318 of the second application 312. While a user is using one of the applications 310 or 312, a system application program interface (API) may be used to determine the application 310 or 312 to which a particular interaction should be attributed. Typically, a user interacts with only one application at a time, and therefore, even though other applications may be open, the interaction information collected may be attributed to the active application. In some cases, however, the user may be using both application 310 and application 312 contemporaneously, in which case interaction information may be attributable to both applications 310 and 312 as it is collected.

Implementations herein may use a system-wide API hook to capture the user keyboard and mouse events on the entire computing device 300. When a user keyboard or mouse event is detected, the activity-tracking component 104 may use the system API to obtain a process name of an application that is a target of a user input. The activity-tracking component 104 may also determine the point in time of the interaction. Accordingly, for each interaction, the activity tracking component 104 can generate an information pair $(O_i, T_i)$, where O is an operation process name (i.e., the application identified as being the target of the interaction), T is the time at which the interaction occurred, i is a sequence number of the operation (interaction) with an application.

This procedure carried out by activity-tracking component 104 generates a sequence of information pairs, $\{(O_1, T_1), (O_2, T_2), \ldots (O_n, T_n)\}$ for each application used on the computing device 300. The interaction interval for each interaction can be figured out by the difference of the adjacent time points T. For example, the time interval I of an operation j may be denoted as $I_j = T_{j+1} - T_j$. This information can be used to generate a sequence of the operations O, correlated to a particular application, and the time intervals I of each operation $\{(O_1, I_1), (O_2, I_2), \ldots (O_n, I_n)\}$, where $O_n$ denotes the operation with the sequence number n, where O identifies the application that is the target of the operation, while $I_n$ denotes the corresponding time interval for the operation.

Statistical Modeling and Power-Down Interval Estimation

According to some implementations herein an accurate power-down interval may be closely related to a particular application that a user is using. The optimal power-down interval may be defined as a period of time after which turning off the display or otherwise performing power conservation will not annoy the user. Thus, if there is no interaction during the defined power-down interval, it may be assumed that the user has left or is not using the computing device, and the display may be powered down without annoying the user. Further, because the power-down interval may be closely related to the specific application, when the user is using different applications, it is useful to have different optimal power-down intervals. For example, if the user is using an application to watch a movie, then an optimal power-down interval is expected to be quite long, so as to avoid powering down the display during the movie. On the other hand, if the computing device is merely displaying a blank desktop, the power-down interval is expected to be relatively short, since normally a user will not look at a blank desktop for a long time without any interaction, and therefore it is reasonable to assume that the user has left if no interaction has been detected for some period of time. Thus, a suitable power-down interval for watching movies may be set to be considerably longer than a power-down interval used when only a blank desktop is displayed. Further, the power-down intervals for applications such as word processing applications and web browsers might be somewhere in between, depending on the needs and habits of the particular user.

The distribution of these power-down intervals on various applications may be referred to as a user-leaving pattern. For example, if the user is using a particular application, then after the optimal power-down interval of no user interaction, the management component may assume with a high probability that the user has either left the computing device or is otherwise not currently using the computing device. Thus, if it is highly probable based on the collected statistical interaction information and any feedback that the user is not using the computing device, the display can be powered down for energy saving purposes. Further, because the interval patterns and determined user-leaving patterns vary from application to application, implementations herein automatically learn the user-leaving pattern for each application.

Additionally, the interval patterns and user-leaving pattern can vary significantly from user to user. Thus, implementations herein apply a learning process to learn the statistical patterns by analysis of historical interaction intervals as well as any feedback received from a user when a power-down interval is incorrectly applied. Thus, over time implementations herein are able to determine a particular user's habitual interaction intervals and user-leaving patterns for the each application based on feedback or lack of feedback. This enables implementations herein to determine with a high probability whether a user is no longer using the computing device when a particular application is active.

When intervals have been collected for multiple applications, the intervals for the same application can be separated out and grouped together. Accordingly, for each application, there may be a set or group of intervals. The group of intervals indicates a history of the user interaction intervals corresponding to a specific application, and these groups of intervals may serve as the source of the learning and modeling herein. For example, assume that on an application $P_k$, the historical intervals group is: $P_k \{I_1, I_2, \ldots, I_n\}$. Implementations herein may first filter out the very short intervals in the group, as those intervals tend to be noise in the leaving-pattern analysis. After filtering, the intervals group may be represented as: $P_k \{I_1', I_2', \ldots, I_m'\}$. Some implementations may generate a distribution representation for these intervals, such as a cumulated distribution function (CDF) chart, a normal distribution representation (i.e., a bell curve), or other suitable distribution representation which may be used to determine a percentage of interval samples below a specific number. For example, in the case of a CDF chart, the x-axis may represent the interval value, and the y-axis may represent the percentage of intervals that are smaller than this interval value. For instance, a CDF chart may indicate that 80% of the intervals are less than 3 minutes. Accordingly, the modeling component may determine the power-down interval based on this information.

Some implementations may apply a percentage value, referred to herein as a confidence value C, for determining the power-down interval. The confidence value C indicates that a percentage of interaction intervals that are below a defined interval value, in other words, the confidence value is the assumed probability that the user has left or is no longer using the computing device. This percentage can be used to obtain a corresponding interval value from the interval distribution, such as in the CDF chart, which may then be used as the initial power-down interval for the specific application. According to the initial power-down interval, the confidence value C provides the probability that the user is not using the computing device, and therefore will not be annoyed if the display is powered-down following a period of no user interaction equal to the initial power-down interval. For instance, "annoying" a user, as used herein may mean that the display is powered down while the user is still looking at the display. As an example, if the confidence value C is set to be 95 percent, then probability of annoying the user is 5 percent if the display is powered down based on the corresponding initial power-down interval. Further, implementations herein may adjust the confidence value C to tune or optimize the probability of annoying the user, but at the same time, this may also affect the amount of power savings that may be achieved.

Implementations herein can also take into consideration the freshness of the historical intervals. For example, user preferences and habits may change over time, so newer interaction information can more accurately represent the current user behavior. Thus, the more recent interaction information can be given a higher priority for estimating the power-down intervals. Accordingly, some implementations may apply different weights to each historical interval, $P_k \{I_1', I_2', \ldots, I_m'\}$, based on their freshness, i.e., the older interaction information is given lower weight, while the newer interaction information is given a higher weight, so the newer data will have a greater effect on the statistical result and the final estimate of the power-down interval. For example, assume that the weights for historical interval $P_k \{I_1', I_2', \ldots, I_m'\}$ are $\{W_1', W_2', \ldots, W_m'\}$, where $W_1' < W_2' < \ldots < W_m'$, considering the refreshness of the intervals, the average of interval $P_{avg}$ = $(I_1'*W_1' + I_2'*W_2' + \ldots + I_m'*W_m')/(W_1' + W_2' + \ldots + W_m')$. In this case, newer data will impact more than older data, and this effect may be similar for other statistics, such as CDF or other distribution representation.

User Feedback Monitoring

When the display is powered down based on the initial power-down interval, user feedback in response to the power-down may be monitored. Two user feedbacks may be observed when the display is powered down: annoyance or acceptance. If the user is still looking at the display when the display is powered down, the user will typically perform some interaction immediately to turn the display back on. This situation is referred to herein as annoying the user, which means that the initial power-down interval for the current application is too short, and may be adjusted to be a longer value to attempt to avoid annoying the user in the future. On the other hand, if the user is not using the computing device (e.g., has left the computing device), then when the display is powered down there will be no user interaction in response to the powering down of the display. This situation is referred to herein as "acceptance", which means that either the initial power-down interval is currently set at a proper or optimum value, or it is possible that a shorter power-down interval might be suitable for the particular application. Based on the user feedback, implementations herein may dynamically adjust the power-down interval value to be a more optimal value for the particular application.

Power-Down Interval Tuning

The user feedback monitoring results can be used as a guide to dynamically adjust the power-down interval, so as to save more power, while still attempting to avoid annoying the user. In order to avoid annoying the user, implementations herein may apply a tuning factor F to tune the power-down interval according to the user feedback. For instance, if the feedback shows that the user is annoyed, then a tuning factor $F=V_1$ may be applied, where $V_1$ is a value larger than 1, so each time the user is annoyed, the power-down interval for the current application will be increased by the factor F so as to attempt to avoid annoying the user next time.

On the other hand, if the feedback shows acceptance, then a second tuning factor $F=V_2$ may be applied where $V_2$ is a value less than 1, but larger than 0, so each time the display is successfully powered down without annoying the user, the power-down interval may be shortened for increasing the power savings. Additionally, in order to avoid frequent user annoyance, implementations herein may set a threshold to limit the range over which the power-down interval may be changed based on the historical interval distribution for the particular application and any recently logged interaction information.

Using the Tuned Application-Specific Power-Down Intervals

As illustrated in FIG. 4, according to some implementations, the power-down intervals 116 may include a mapping list 400 that lists each of the applications present on a computing device and the corresponding power-down interval for each application. For example, mapping list 400 may include the application name 402 and the application-specific power-down interval 404. The applications may be listed by name, e.g., "Application 1", "Application 2", . . . , "Application N", and corresponding power-down intervals in hours, minutes and seconds. The mapping list 404 may be used by control component 118 along with a timing mechanism to control the power to displays or other components. Thus, in the example framework 100 of FIG. 1, the control component 118 may maintain the mapping list 400 for each application 108. The control component 118 may determine periods of user inactivity for an active application from the interaction information 110 and based on a current time, such as may be determined from a computing device clock, or the like. The control component may compare this inactivity information with the power-down interval 404 for the active application to determine when the power-down interval has been exceeded.

Further, while some implementations of the management component 102 herein are fully automated for estimating and managing power settings, other implementations may enable a user to manually manage the power settings for particular applications or for all applications. For example, list 400 may be part of a power management interface that can be presented to a user. The list 400 may include an automatic control option 406 and a manual control option 408 that are alternately selectable for each application. The user may select a particular application from the list and may manually specify a particular power-down interval 404 to be applied when the particular application is active, while the power-down intervals 404 for other applications may continue to be managed by the management component 102. For example, as illustrated at 410, "Application 8" has been selected for manual power management. This may result in an expanded menu that enables the user to specify a display power-down interval 412, an other component power-down interval 414, and a standby interval 416 for placing the system on standby. Still alternatively, the user may be provided with an option to turn off the automated power management altogether, and which may enable the user to specify a desired power-down interval for an entire computing device in a conventional manner.

Framework for Computing Device Power Management

Figure 5:
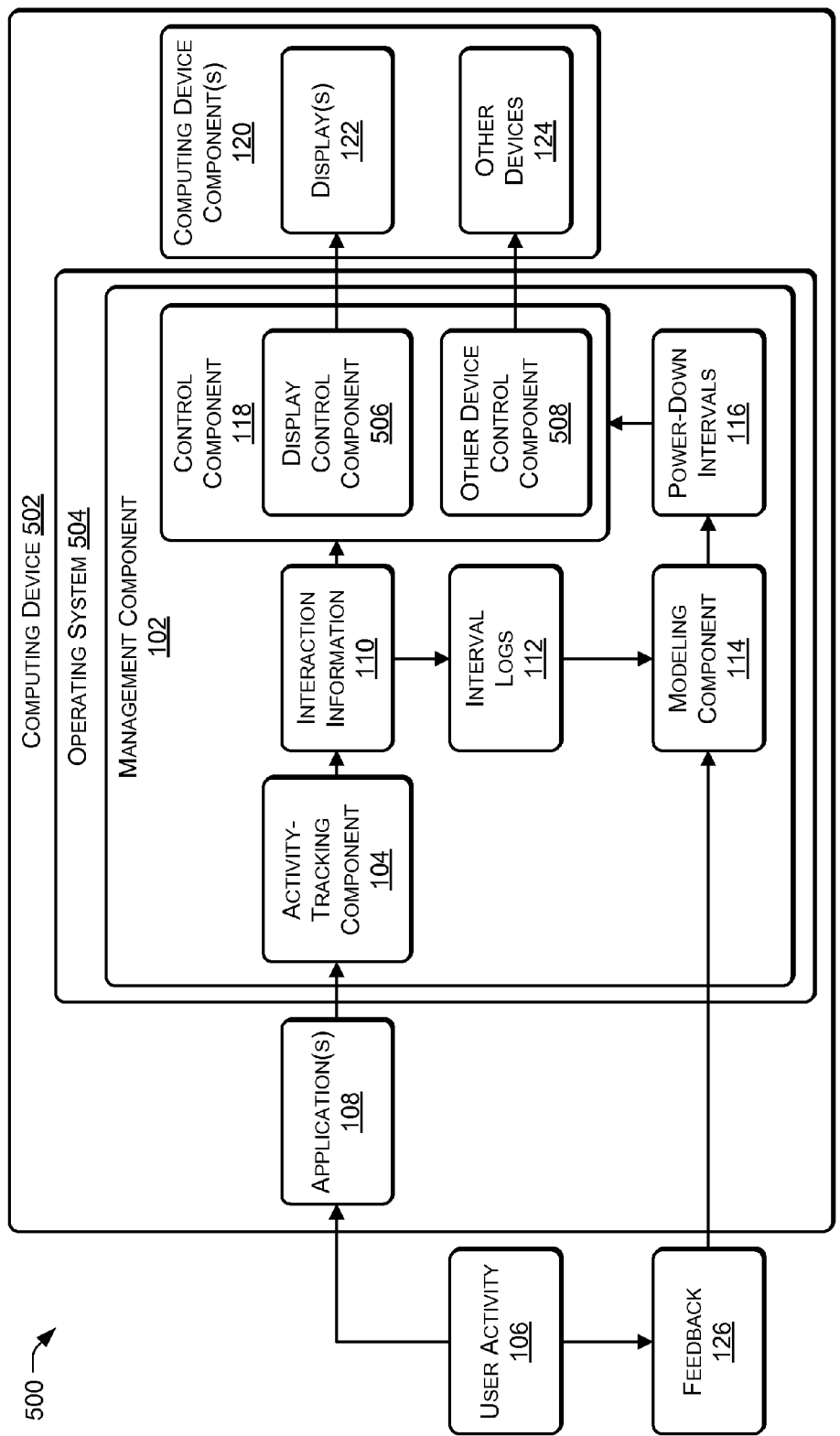
FIG. 5 is a block diagram of an example framework for application-specific power management implemented in an operating system according to some implementations.

FIG. 5 is a block diagram of a framework 500 for power management of a computing device 502 according to some implementations herein. In the framework 500, the management component 102 is a power management component of an operating system 504 of the computing device 502. For example, operating system 504 may be an operating system for controlling basic functions of the computing device 502. In this example, the management component 102 may perform power management not only of displays 120, but also of other devices 124 of the computing device 502. For example, control component 118 may include a display control component 506 and other device control component 508. Thus, control component 118 may function as described above for determining when a power-down interval has been reached for an active application. This may trigger the display control component 506 to send a signal to the display 122 for placing the display 122 in a low-power or power-off mode.

Similarly, the other device control component 508 may power-down the other devices 124 of the computing device 502, such as spinning down a hard disk drive, turning off a graphics card, placing the computing device 502 into sleep, standby, hibernation, or the like. Furthermore, because powering down of these other components may cause a more considerable time delay in powering the components back up, the other device control component 508 may be configured to wait a predetermined amount of time following the powering down of the display 122, and after no feedback has been received, before powering down the other devices 124. Additionally, as discussed above, in some implementations, no powering down of the other devices 124 may take place, or the user may manually specify power down periods for the other devices 124, including a sleep, standby or hibernation period.

Additionally, the operating system 504 may also be considered to be one of applications 108 for purposes of the power management techniques disclosed herein. Consequently, the operating system may also have a power-down interval determined for powering down components of the computing device when only the operating system is active on the computing device, such as when only the desktop is displayed. For example, the power-down interval for an operating system will typically be rather short in comparison to the other applications 108, as a user is unlikely to be looking at a blank desktop for long periods of time without any interaction.

Example Process

Figure 6:
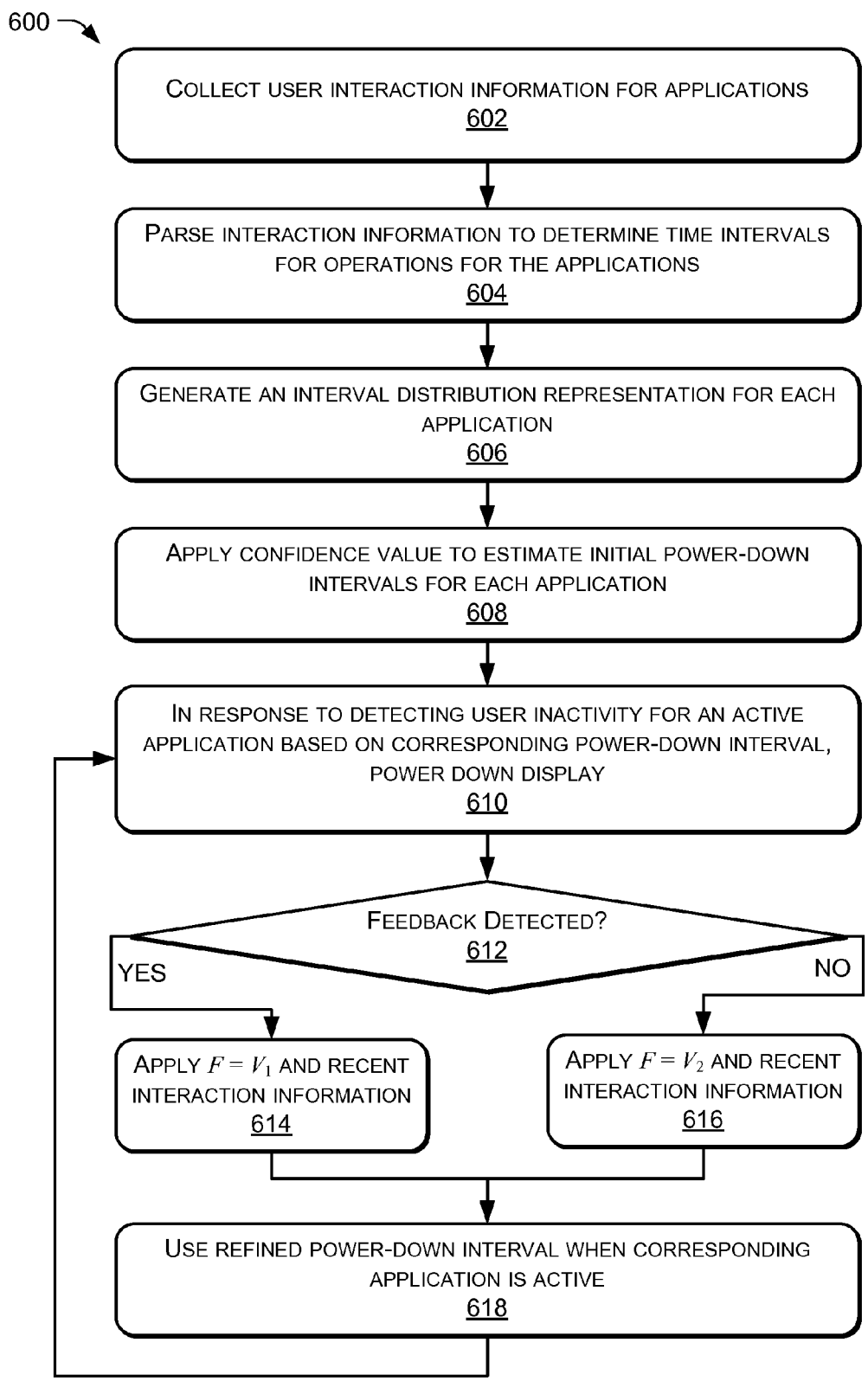
FIG. 6 is a flow diagram of an example process for application-specific power management according to some implementations.

FIG. 6 is a flow diagram of an example process 600 for application-specific power management according to some implementations herein. In the flow diagram, each block represents one or more operations that can be implemented in hardware, software, or a combination thereof. In the context of software, the blocks represent computer-executable instructions that, when executed by one or more processors, cause the processors to perform the recited operations. The order in which the blocks are described is not intended to be construed as a limitation, and any number of the described operations can be combined in any order and/or in parallel to implement the process. For discussion purposes, the process 600 is described with reference to the frameworks 100 of FIG. 1 and 500 of FIG. 5, although other frameworks, devices, systems, architectures and environments may implement this process.

At block 602, user interaction information is collected for applications that are used on a computing device. For example, the activity-tracking component 104 may collect the user interaction information 110 as described above when the applications 108 are used on the computing device.

At block 604, the interaction information is parsed to determine time intervals for operations for each the use for which interaction information has been collected. For example, the modeling component may parse the interaction information 110 contained in the interval logs 112 for determining the time intervals.

At block 606, the modeling component may generate an interval distribution representation for each application for which data has been collected. For example, the modeling component may generate a CDF representation, or other distribution representation, of the intervals for each application for determining a distribution of the intervals.

At block 608, a confidence value may be used to estimate an initial power-down interval for each application. For example, the confidence value C may be a desired percentage of the confidence in the probability that the user will not be annoyed when the power-down interval is applied. Thus, if the confidence value is set to 95 percent the probability of annoying the user will be 5 percent. Further, while the user the confidence value has been described as one example of a technique for estimating a power-down interval, numerous other techniques and models are also contemplated for determining the power-down intervals, as will be apparent to those of skill in the art in light of the disclosure herein.

At block 610, in response to detecting a period of user inactivity while a particular application is active on the computing device, a particular power-down interval corresponding to the particular application is applied to power-down the display when the period of user inactivity becomes equal to or exceeds the particular power-down interval. For example, suppose that a word processing application was the last application used by the user of the computing device before the period of inactivity. The control component refers to the power-down interval established for the word processing application and, when the period of user inactivity is equal to the power-down interval for the word processing application, the control component may begin to power-down the display.

At block 612, the management component determines whether feedback has been provided by the user following the powering down of the display.

At block 614, if the user does provide feedback, that means that the power-down interval for the particular application is probably too short. Accordingly, the modeling component may apply the tuning factor $F=V_1$ to the power-down interval for the particular application for increasing the power-down interval. For example, $V_1$ may be a value larger than one that is factored against the power-down interval for increasing the power-down interval for the particular application. Furthermore, the historic interval information for the application, including recent interaction information, may be applied when determining the new power-down interval, and may be used to establish a threshold to limit the amount of change that may be made to the power-down interval. Furthermore, in some implementations, the more recent interaction information may be given a greater weight than older interaction information.

At block 616, if the user does not provide feedback, then that indicates that the power-down interval for the particular application may be optimum, or may be too long. Accordingly, in some implementations, the modeling component may apply the tuning factor $F=V_2$ to the power-down interval for the particular application for decreasing the power-down interval, to thereby possibly save more energy. For example, $V_2$ may be a value between one and zero that is factored against the power-down interval for decreasing the power-down interval for the particular application. Furthermore, the historic interval information for the application, including recent interaction information, may be applied when determining the new power-down interval, and may be used to establish a threshold to limit the amount of change that may be made to the power-down interval. Furthermore, in some implementations, the more recent interaction information may be given a greater weight than older interaction information.

At block 618, the refined power-down interval is used as the established power-down interval when the particular application next becomes active. For example, the process may return to block 610 to use the refined power-down interval, and in this manner, the power-down interval is continually refined and optimized according to the habits of the particular user.

Computing System Environment

Figure 7:
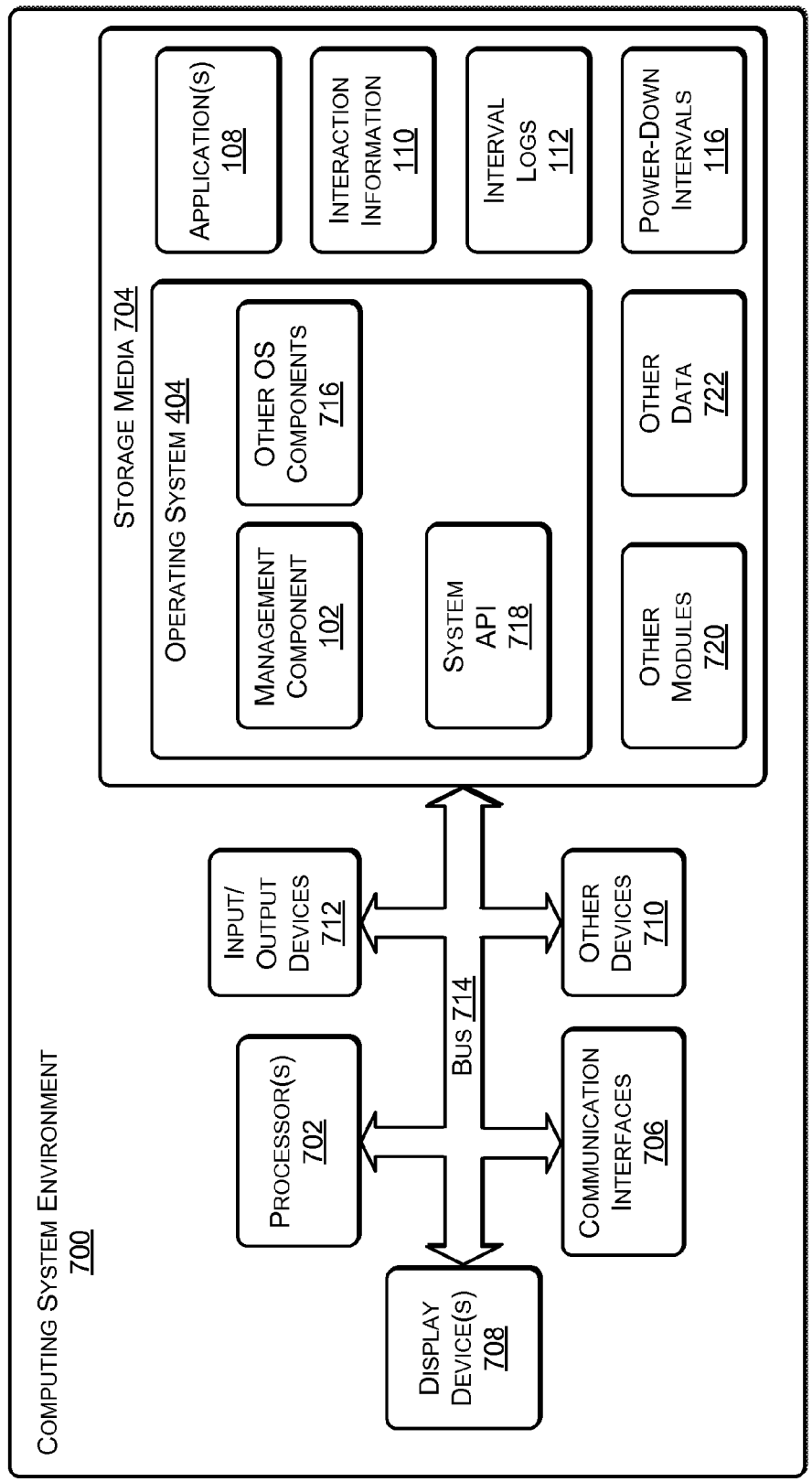
FIG. 7 is a block diagram of an example of a suitable computing system environment according to some implementations.

FIG. 7 illustrates an example configuration of a suitable computing system environment 700 according to some implementations herein. The computing system environment 700 may correspond to computing device 300 of FIG. 3, computing device 500 of FIG. 5, or other suitable device or system configured to implement the application-specific power management frameworks and techniques disclosed herein. Computing system environment 700 may include at least one processor(s) 702, a storage media 704, communication interfaces 706, at least one display device(s) 708, other devices 710, and input/output devices 712, all able to communicate through a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the storage media 704.

Storage media 704 is an example of computer-readable storage media for storing instructions which are executed by the processor 702 to perform the various functions described above. For example, storage media 704 may generally include memory and memory devices, such as both volatile memory and non-volatile memory (e.g., RAM, ROM, or the like). Further, storage media 704 may also include one or more mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Storage media 704 may be collectively referred to as memory or computer-readable storage media herein. Storage media 704 is capable of storing computer-readable, processor-executable program instructions as computer program code that can be executed on the processor 702 as a particular machine configured for carrying out the operations and functions described in the implementations herein.

Storage media 704 may include the operating system 504 and management component 102, which can be executed on the processor 702 for implementing the power management functions described herein. Management component 102 corresponds to management component 102 discussed above, such as with respect to FIGS. 1 and 5, and may include activity-tracking component 104, modeling component 114, control component 118, display control component 506 and other device control component 508, which are not shown in FIG. 7 for clarity. Operating system 504 may further include other operating system components 716, such a user interface component, a kernel, and so forth. Additionally, operating system 504 may include a system API 718, as discussed above for use by the activity-tracking component 104 in collecting the user interaction information 110 and for attributing the collected information to the proper application. Storage media 704 may also include applications 108, interaction information 110, interval logs 112 and power-down intervals 116, e.g., as mapping list 400. Further, storage media 704 may include other modules 720, such as device drivers, and the like, as well as other data 722, such as data used by applications 108. In addition, in other implementations, management component 102 may be a separate component from operating system 504 and/or may be a component of an application, or the like.

The computing system environment 700 can also include one or more communication interfaces 706 for exchanging data with other devices, such as via a network, direct connection, and so forth. The communication interfaces 706 can facilitate communications within a wide variety of networks and protocol types, including wired networks (e.g., LAN, cable, etc.) and wireless networks (e.g., WLAN, cellular, satellite, etc.), the Internet and the like.

The display device(s) 708, may be any know display device such as an LCD or CRT monitor, television, projector, touch screen or other display or screen able to have power controlled by management component 102. Other devices 710 may include various other devices that may be powered down or otherwise subject to the power management techniques herein, such as a video card, peripheral devices, and the like. In addition input/output devices 712 may include mouse 308 and keyboard 306, as well as various other input devices, such as a remote controller, a camera, microphone, a joystick, and so forth, and output devices, such as speakers, printers, and the like. Input/output devices 712 may also be subject to power conservation according to the power management techniques herein.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 7 as being stored in storage media 704 of computing system environment 700, management component 102, or portions thereof, may be implemented using any form of computer-readable media that is accessible by computing system environment 700. Computer-readable media may include, for example, computer storage media and communications media. Computer storage media is configured to store data on a non-transitory tangible medium, while communications media is not.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein provide a power management strategy which is application-specific, and which is able to automatically set different power-down intervals for different applications. The power-down intervals may be continually optimized for the corresponding applications based upon the behavior of the individual user. Consequently, the power management strategy herein is automatically tuned based on a user's interaction history and feedback.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   collecting user interaction information with respect to one or more applications that are used on a computing device;
   determining, for an individual application of the one or more applications, a statistical distribution of time intervals between interactions that includes a percentage distribution of a group of time intervals of the time intervals;
   establishing, by a processor of the computing device, a power-down interval for an application of the one or more applications based on the percentage distribution of the statistical distribution for the application; and
   powering down a display of the computing device when a period of a user inactivity exceeds a particular power-down interval corresponding to a particular application that was last used on the computing device.

2. The method according to claim 1, further comprising receiving feedback from a user of the computing device in response to powering down of the display, wherein the feedback comprises an input to the computing device from the user.

3. The method according to claim 2, further comprising, in response to the feedback, increasing a length of time of the particular power-down interval corresponding to the particular application.

4. The method according to claim 1, further comprising, when no feedback is received, decreasing a length of time of the particular power-down interval to determine whether the particular power-down interval can be optimized for maximizing power savings.

5. The method according to claim 1, wherein
there are a plurality of the applications; and
the individual application has a corresponding application-specific power-down interval determined based on the user interaction information collected when the application is used on the computing device.

6. The method according to claim 1, further comprising adjusting the power-down interval based on a user habit associated with the particular application.

7. A method comprising:
collecting, by a computing device including one or more processors, user interaction information for a particular application to determine an initial power-down interval for the particular application, the user interaction information including a plurality of time intervals, an individual time interval of the plurality of time intervals representing a time period between detected user interaction with an individual application of a plurality of applications;
establishing, by the computing device including one or more processors, a particular power-down interval corresponding to the particular application based on the user interaction information and on a confidence value that represents a probability that at least one component will not be powered-down while a user is using the computing device;
detecting, by the computing device including one or more processors, that a period of user inactivity following use of the particular application has exceeded the particular power-down interval established for the particular application; and
in response to the detecting, initiating, by the by the computing device including one or more processors, power conservation for the at least one component.

8. The method according to claim 7, wherein:
the at least one component is a display; and
the initiating power conservation comprises placing the display into a low-power mode.

9. The method according to claim 7, wherein the detecting that a period of user inactivity following use of the particular application has exceeded the particular power-down interval established for the particular application further comprises detecting that no user inputs have been received following a last input by the user for interaction with the particular application.

10. The method according to claim 7, further comprising:
receiving, by the computing device including one or more processors, feedback in response to initiating the power conservation; and
responsive to the feedback, increasing, by the computing device including one or more processors, a length of time of the power-down interval.

11. The method according to claim 10, wherein increasing a length of time of the power-down interval further comprises increasing the length of time of the power-down interval based on a tuning factor.

12. The method according to claim 7, further comprising, when no feedback is received in response to initiating the power conservation, decreasing, by the computing device including one or more processors, a length of time of the power-down interval.

13. The method according to claim 7, further comprising adjusting the particular power-down interval based on a user habit associated with the particular application.

14. Computer-readable storage media containing processor-executable instructions to be executed by a processor for carrying out the method according to claim 7.

15. A computing device comprising:
a processor in communication with storage media;
an activity-tracking component, maintained in the storage media and executed on the processor, to collect user interaction information with respect to a plurality of applications used on the computing device, the user interaction information including a plurality of time intervals, an individual time interval of the plurality of time intervals that represents a period of time between detected user interaction with one of the applications; and
a modeling component to determine a distribution of time intervals for an individual application of the applications for establishing a power-down interval for the individual application, the power-down interval being refined by analyzing a log that includes historical interactions between a user and the individual application, the distribution of time intervals including a percentage distribution of a group of time intervals of the time intervals.

16. The computing device according to claim 15, further comprising a control component to compare the power-down interval for a particular application with a period of user inactivity when the particular application is active on the computing device for powering-down a component of the computing device when the period of user inactivity equals or exceeds the power-down interval for the particular application.

17. The computing device according to claim 16, wherein the modeling component is configured to:
receive feedback in response to the powering down of the component of the computing device; and
adjust the power-down interval for the particular application responsive to the feedback.

18. The computing device according to claim 17, wherein the modeling component is configured to adjust the power-down interval for the particular application based at least on historic user interaction with the particular application.

19. The computing device according to claim 16, wherein the control component is further configured to receive a list of the applications and corresponding power-down intervals, wherein the list indicates that a power-down interval for at least one of the applications of the plurality of applications is manually configurable.

20. The computing device according to claim 15, wherein the analyzing a log tracking historical interactions between a user and the individual application comprises analyzing the log tracking historical interactions between the user and the individual application based freshness of the historical interactions.

* * * * *